Patented Oct. 24, 1950

2,526,648

UNITED STATES PATENT OFFICE 2,526,648

NONCAKING DDT POWDER CONTAINING CARBON BLACK

William Vance Freed, Wilmington, Del., assignor, by mesne assignments, to the United States of America as represented by the Secretary of War No Drawing. Application August 29, 1946, Serial No. 693,819

7 Claims. (Cl. 167—30)

This invention relates to a non-caking, water-dispersible, insecticidal powder containing as its active ingredient DDT, hereinafter referred to as dichlorodiphenyltrichloroethane.

Dichlorodiphenyltrichloroethane or, more particularly, the 2,2-bis (para-chlorophenyl)-1,1,1-trichloroethane isomer of dichlorodiphenyltrichloroethane, has won wide acceptance as an insecticide. The compound, which is crystalline at room temperature, is commonly used in liquid solution, or dispersed in an emulsion, or in solid form mixed with a finely divided solid carrier.

It is desirable to ship dichlorodiphenyltrichloroethane in highly concentrated form prior to its incorporation with the carrier, because a ready-for-use preparation (solution, emulsion, or mixed powder) is comparatively bulky. For instance, an aqueous emulsion containing only 1 per cent of dichlorodiphenyltrichloroethane is quite effective as a fly spray; and shipment of an emulsion containing 99 per cent of inert material would be most uneconomical. Heretofore it has not been practical in many cases to ship concentrated dichlorodiphenyltrichloroethane in powder form because of its tendency to cake. Caking of concentrated dichlorodiphenyltrichloroethane takes place after comparatively few hours at temperatures not greatly in excess of room temperature, which is particularly undesirable in shipments to tropical climates. While crystalline or powdered dichlorodiphenyltrichloroethane readily enters into aqueous emulsions in the presence of an appropriate emulsifier, its emulsification is retarded when it cakes.

It is therefore an object of the present invention to provide a non-caking insecticidal powder having as its active ingredient dichlorodiphenyltrichloroethane.

Another object of the present invention is a non-caking mixture of highly concentrated dichlorodiphenyltrichloroethane powder and a minor portion of an inert powder conferring non-caking properties upon the dichlorodiphenyltrichloroethane without interfering with its insecticidal properties.

A further object of this invention is a non-caking mixture of highly concentrated, finely divided dichlorodiphenyltrichloroethane and an extremely finely divided inert substance, made water-dispersible by the addition of an appropriate surface-active agent.

Still another object of this invention is the preparation for shipment of highly concentrated dichlorodiphenyltrichloroethane to assure its arrival at the point of destination in non-caking form.

Other objects and advantages of the invention will appear in the following detailed description.

I have found that highly concentrated dichlorodiphenyltrichloroethane powder can be made non-caking even at elevated temperatures by the addition of a small amount of carbon black. The mixture is made water-dispersible by adding thereto a small amount of a surface-active agent capable of dispersing dichlorodiphenyltrichloroethane in water.

I have found that for the purpose of the present invention, the dichlorodiphenyltrichloroethane is to be reduced to a particle size of less than 20 microns (.02 mm.), and preferably to a particle size between 1 and 10 microns (.001 and 0.1 mm.), as dichlorodiphenyltrichloroethane of larger particle size does not disperse well in water.

The non-caking powders of this invention contain a major portion, i. e., from about 85% to about 98% by weight, of dichlorodiphenyltrichloroethane.

The carbon black used as an admixture to the dichlorodiphenyltrichloroethane in order to confer non-caking properties on the latter, is suitable for this purpose if its apparent density is below .2. Apparent density or bulk density, as the term is used in the present disclosure, is the weight of 1 cubic centimeter of loose dry finely divided material, measured without packing (see Gardner, "Physical and Chemical Examination of Paints, Varnishes, Lacquers and Colors," ninth edition, 1939, pages 279, 280); thus 1 cubic centimeter of loose carbon black particles should weigh less than .2 gram in order to be suitable to make dichlorodiphenyltrichloroethane non-caking. I have found that low apparent density of the admixed finely divided carbon is more important to the non-caking properties of the mixture than the size of the carbon particles. Thus, charcoal powders of various origins having apparent densities between .26 and .60 have been found not to confer caking resistance to dichlorodiphenyltrichloroethane, even after they have been reduced to a particle size comparable to that of carbon black. Various brands of carbon black, such as "Superba" Black, "No. 242" Black, "Neo-Spectra Mark III" and "Peerless" are well adapted for my purpose as long as the bulk density is below .2. Tests for determining bulk density of carbon black are described in Gardner, cited above. The low bulk density carbon black is mixed with finely divided dichlorodiphenyltrichloroethane powder in amounts between about 2 per cent and 15 per cent; preferably between about 3 per cent and about 7 per cent, based on the weight of the dichlorodiphenyltrichloroethane.

Any surface-active agent capable of dispersing dichlorodiphenyltrichloroethane in water is suitable for use in the dichlorodiphenyltrichloroethane-carbon black mixture of the present invention. Examples of surface-active agents are alkylated hydrocarbon sulfonic acid salts, such as "Aresklene 400," "Santomerse No. 34," Nacconol NRSF," "Nacconol FSNO," "Igepon T," etc.; hydroxylated polymers, such as polyvinyl alcohol, methycellulose, sodium alginate; and polymeric ethers, such as "Triton N-100" and "Triton 770." Auxiliary surface-active agents such as "Daxad-11," (a sulfonated naphthaleneformaldehyde condensation product) are frequently helpful in improving the degree of dispersion. The surface-active agent is used in amounts of about 1 per cent to 5 per cent, preferably 2 per cent to 3 per cent, of the total composition.

The following examples will serve to illustrate three specific applications of my invention, but are not to be considered as limitations upon the scope thereof.

*Example 1*

91 parts of a composition containing 97.5 per cent 2,2-bis (parachlorophenyl)-1,1,1-trichloroethane, 1.95 per cent polyvinyl alcohol (medium viscosity, 85 per cent hydrolyzed polyvinyl acetate) and 0.55 per cent "Aresklene 400" (dibutylphenylphenol-sodium disulfonate) is micronized in an air-attrition mill to a particle size of 1 to 10 microns, then blended with 9 parts of carbon black of bulk density 0.14 ("Superba" Black). The final composition, which contains 88.8 per cent 2,2-bis (para-chlorophenyl)-1,1,1-trichloroethane is readily dispersible in water and shows no sign of caking after 65 hours at a temperature of 65° C., whereas the original 2,2-bis (para - chlorophenyl) - 1,1,1 - trichloroethane powder without the carbon black cakes badly after 16 hours at that temperature.

*Example 2*

A composition containing 91.6 per cent 2,2-bis (para-chlorophenyl)-1,1,1-trichloroethane, 4.5 per cent "Superba" Black, 2 per cent polyvinyl alcohol (medium viscosity, 85 per cent hydrolyzed polyvinyl acetate), 1 per cent "Aresklene 400," and 0.9 per cent "Daxad-11" (a sulfonated naphthalene-formaldehyde condensation product) is air-micronized to a particle size of 1 to 10 microns. The resulting composition is resistant to caking after being subjected for several months to a temperature of 65° C. It is readily made into an aqueous dispersion by stirring equal parts of powder and water to a smooth paste and diluting to the desired concentration. An aqueous dispersion containing 1 per cent 2,2-bis (para-chlorophenyl)-1,1,1-trichloroethane is entirely satisfactory as a residual wall spray to control flies.

*Example 3*

Micronized 2,2-bis (para-chlorophenyl)-1,1-trichloroethane of 1 to 10 micron particle size is dry-blended with "Superba" Black (see Example 1) in a high speed stirrer in the weight ratio of 90 to 7. The mixture shows no caking after 6 days exposure to a temperature of 65° C. The mixture is not water-dispersible because of the absence of a surface-active agent.

*Example 4*

The mixture of Example 3 is made up in the weight ratio of 90 parts of 2,2-bis (para-chlorophenyl)-1,1,1-trichloroethane to 4 parts of "Superba" Black. The result is the same as in Example 3.

*Example 5*

The mixture of Example 3 is made up in the weight ratio of 90 parts of 2,2-bis (para-chlorophenyl)-1,1,1-trichloroethane to 2 parts of "Superba" Black. Results again are the same as in Example 3.

*Example 6*

A composition containing 91.5% 2,2-bis (para-chlorophenyl)-1,1,1-trichloroethane, 5.0% carbon black having a bulk density of 0.15 "No. 242" Black, 2% polyvinyl alcohol (medium viscosity, 85% hydrolyzed polyvinyl acetate), 1% "Daxad-11," and 0.5% "Aresklene 400" is air-micronized to a particle size of 1 to 10 microns. The resulting composition is resistant to caking and dispersible in water after being subjected to a temperature of 65° C. for 14 days.

*Example 7*

A mixture containing 91.5% 2,2-bis (para-chlorophenyl)-1,1,1-trichloroethane, 6.0% "Peerless" Black having a bulk density of 0.13, 0.5% "Aresklene 400," and 2.0% polyvinyl alcohol (medium viscosity, 85% hydrolyzed polyvinyl acetate) is blended by tumbling in a closed container and air-micronized to a particle size of 1 to 10 microns. The resulting composition is free-flowing after being subjected to temperature of 65° C. for 90 days.

*Example 8*

A mixture containing 91.5% 2,2-bis (para-chlorophenyl)-1,1,1-trichloroethane, 6.0% "Neo-Spectra Mark III" carbon black having a bulk density of 0.12, 0.5% "Aresklene 400," and 2.0% polyvinyl alcohol (medium viscosity, 85% hydrolyzed polyvinyl acetate) is blended and air-micronized to particle size of 1 to 10 microns by the procedure of the preceding example. The resulting composition is likewise free-flowing after being subjected to a temperature of 65° C. for 90 days.

The dichlorodiphenyltrichloroethane used in the preparation of the non-caking mixture should have a degree of purity exceeding that of technical dichlorodiphenyltrichloroethane, as the latter requires a comparatively large mixture of carbon black in order to remain free-flowing at 65° C. Dichlorodiphenyltrichloroethane melting above 102° C. is suitable, but recrystalized material having a melting point of about 106° C. or higher is preferred. The melting point of purified dichlorodiphenyltrichloroethane available commercially is 103°–105° C.

Having thus described several embodiments of my invention, I desire to define its scope by the appended claims.

I claim:

1. An insecticidal powder concentrate comprising at least 85% by weight of finely divided 2,2 bis(parachlorophenyl)-1,1,1-trichloroethane having a particle size of less than 20 microns and a melting point above 102° C., and at least 2% by weight of finely divided carbon black having an apparent density of not more than .2 gram per cubic centimeter, said insecticidal powder being non-caking at a temperature of 65° C.

2. An insecticidal powder concentrate comprising at least 85% by weight of finely divided 2,2 bis(parachlorophenyl)-1,1,1-trichloroethane having a particle size of less than 20 microns and a melting point of about 106° C., and at least 2% by weight of finely-divided carbon black having an apparent density of not more than .2 gram per cubic centimeter, said insecticidal powder being non-caking at a temperature of 65° C.

3. An insecticidal water-dispersible powder concentrate comprising at least 85% by weight of finely divided recrystallized 2,2 bis(parachlorophenyl)-1,1,1-trichloroethane having a particle size of less than 20 microns and a melting point of about 106° C., at least 2% by weight of finely divided carbon black having an apparent density of not more than .2 gram per cubic centimeter, and between 1 and 5% by weight of a surface-active agent capable of dispersing said 2,2 bis-(parachlorophenyl)-1,1,1-trichloroethane in water, said insecticidal powder being non-caking at a temperature of 65° C.

4. A non-caking insecticidal powder concentrate comprising at least 85% by weight of finely divided 2,2-bis (parachlorophenyl)-1,1,1-trichloroethane having a particle size of less than 20 microns, and at least 2% by weight of carbon black having an apparent density of not more than .2 gram per cubic centimeter, said insecticidal powder being non-caking after exposure to a temperature on the order of 65° C.

5. A non-caking water dispersible insecticidal powder concentrate comprising at least 85% by weight of 2,2-bis (parachlorophenyl)-1,1,1-trichloroethane having a particle size of less than 20 microns, at least 2% by weight of carbon black having an apparent density of not more than .2 gram per cubic centimeter, and at least 1% by weight of a surface active agent capable of dispersing said 2,2-bis (parachlorophenyl)-1,1,1-trichloroethane in water, said insecticidal powder being non-caking after exposure to a temperature on the order of 65° C.

6. A non-caking insecticidal powder concentrate comprising by weight

| | Per cent |
|---|---|
| 2,2 - bis (parachlorophenyl) - 1,1,1 - trichloroethane less than 20 microns | at least 85 |
| Carbon black having an apparent density of not more than .2 gram per cubic centimeter | 2 to 15 |
| 2,2 - bis (parachlorophenyl) - 1,1,1 - trichloroethane dispersant surface active agent | 1 to 5 | said insecticidal powder concentrate being non-caking after exposure to a temperature on the order of 65° C.

7. A non-caking insecticidal powder concentrate comprising by weight

| | Per cent |
|---|---|
| Carbon black having an apparent density of not more than .2 gram per cubic centimeter | 3 to 7 |
| 2,2-bis (parachlorophenyl)-1,1,1-trichloroethane dispersant surface active agent | 2 to 3 |
| 2,2, - bis - (parachlorophenyl) - 1,1,1 - trichloroethane 1 to 10 microns | remainder | said insecticidal powder concentrate being non-caking after exposure to a temperature on the order of 65° C.

WILLIAM VANCE FREED.

REFERENCES CITED

The following references are of record in the file of this patent:

UNITED STATES PATENTS

| Number | Name | Date |
|---|---|---|
| Re. 22,700 | Muller | Dec. 4, 1945 |
| 47,099 | Funnell | Apr. 4, 1865 |
| 2,014,609 | Barnhill | Sept. 17, 1935 |
| 2,207,737 | Hooft et al. | July 16, 1940 |
| 2,257,545 | Curtis | Sept. 30, 1941 |

FOREIGN PATENTS

| Number | Country | Date |
|---|---|---|
| 547,874 | Great Britain | Sept. 15, 1942 |

OTHER REFERENCES

DDT, by West et al., May 1946, pages 42–44.
Industrial and Engineering Chemistry, April 1942, pages 490–493, by Smith et al.